United States Patent
Bandi et al.

(10) Patent No.: US 11,606,279 B2
(45) Date of Patent: Mar. 14, 2023

(54) SECURE HEARTBEAT MONITORING

(71) Applicant: Fortanix, Inc., Mountain View, CA (US)

(72) Inventors: Nehal Bandi, San Jose, CA (US); Andrew Leiserson, San Francisco, CA (US)

(73) Assignee: Fortanix, Inc., Mountain View, CA (US)

( * ) Notice: Subject to any disclaimer, the term of this patent is extended or adjusted under 35 U.S.C. 154(b) by 234 days.

(21) Appl. No.: 16/925,979

(22) Filed: Jul. 10, 2020

(65) Prior Publication Data

US 2022/0014456 A1 Jan. 13, 2022

(51) Int. Cl.
*H04L 43/10* (2022.01)
*H04L 9/08* (2006.01)
*H04L 9/32* (2006.01)

(52) U.S. Cl.
CPC .......... *H04L 43/10* (2013.01); *H04L 9/0825* (2013.01); *H04L 9/0866* (2013.01); *H04L 9/0897* (2013.01); *H04L 9/3242* (2013.01)

(58) Field of Classification Search
CPC ..... H04L 43/10; H04L 9/0825; H04L 9/0866; H04L 9/0897; H04L 9/3242
See application file for complete search history.

(56) References Cited

U.S. PATENT DOCUMENTS

| | | | | |
|---|---|---|---|---|
| 10,530,777 | B2* | 1/2020 | Costa | H04L 63/101 |
| 2004/0003248 | A1* | 1/2004 | Arkhipov | H04L 9/3247 |
| | | | | 713/170 |
| 2015/0347768 | A1* | 12/2015 | Martin | G06F 21/56 |
| | | | | 726/1 |
| 2017/0026840 | A1* | 1/2017 | Eyal | H04L 63/1433 |
| 2017/0344407 | A1* | 11/2017 | Jeon | G06F 21/74 |
| 2018/0351941 | A1* | 12/2018 | Chhabra | H04L 9/38 |
| 2019/0081983 | A1* | 3/2019 | Teal | G06F 21/606 |
| 2020/0042675 | A1* | 2/2020 | Asanghanwa | H04L 63/123 |

(Continued)

OTHER PUBLICATIONS

Ibrahim et al. "DARPA: a device attestation resilient to physical attacks", ACM, 2016, 171-182 (Year: 2016).*

(Continued)

*Primary Examiner* — Catherine Thiaw
(74) *Attorney, Agent, or Firm* — Lowenstein Sandler LLP (57) ABSTRACT

An application may perform operations within a first secure enclave of a processing device. The application may provide secure monitoring data, such as secure heartbeat information. The monitoring data and an application identity may be verified at a second secure enclave of the processing device using local attestation operations. A remote attestation signature may be generated at the second secure enclave based on the monitoring data, the application identity, and a node private key. A monitoring message signature may be generated at the first secure enclave based on an application private key and a message payload that includes the monitoring data, the application identity, and the remote attestation signature. A monitoring message that includes the payload and monitoring message signature may be sent from the first secure enclave to a monitoring system, which may verify the message to detect unauthorized changes to the monitoring data or the application identity.

20 Claims, 8 Drawing Sheets

(56) References Cited

U.S. PATENT DOCUMENTS

2020/0322145 A1* 10/2020 Sheth .................. H04L 63/0869
2021/0029100 A1* 1/2021 Bendersky .......... H04L 63/0861

OTHER PUBLICATIONS

Gail L. Grant, excerpt from "understanding digital signatures", McGraw-Hill, 33-36, 1998 (Year: 1998).*
Kim et al, titled "A first step towards leveraging commodity trusted execution environments for network applications", ACM, 2015, 7 pages (Year: 2015).*
NIST "the keyed-hash message authentication code (HMAC)", NIST, 2008, 13 pages (Year: 2008).*
Wang et al. "Enabling Security-Enhanced Attestation With Intel SGX for Remote Terminal and IoT"—IEEE, 2018, 88-90 (Year: 2018).*
Dang et al "Autonomous membership service for enclave applications", 2019, Computer Sciences, 13 pages (Year: 2019).*
Chen et al "Towards Efficient Fine-Grained Access Control and Trustworthy Data Processing for Remote Monitoring Services in IoT ", IEEE Transactions on Information Forensics and Security, vol. 14, No. 7, Jul. 2019, p. 1830-1842 (Year: 2019).*
Johnson, S., Scarlata, V., Rozas, C., Brickell, E., & Mckeen, F. (2016). "Intel software guard extensions: EPID provisioning and attestation services". White Paper, 1(1-10), 119 (Year: 2016).*

* cited by examiner

SECURE HEARTBEAT MONITORING

TECHNICAL FIELD

Aspects of the present disclosure relate generally to security, and more specifically, relate to secure heartbeat monitoring.

BACKGROUND

An application management system may monitor applications in a networked computing environment by collecting data about the operation of the applications and performing appropriate actions based on the collected data. The collected data may include information about running applications, such as how heavily loaded each application is, whether any applications are unresponsive, each application's version, host server, and so on. The collected application monitoring data may be used to verify that the applications are operating as expected, as well as to perform actions during operation, such as allocating additional computational resources as demand increases or restarting applications when servers fail. The system may display the collected data about each application in a monitoring interface. Users may rely on the application management system to provide information and notifications about the operational status of applications, and to diagnose problems with the applications. Users may also rely on the collected data to make decisions about whether to add or remove resources, such as servers or network bandwidth, that are used by the applications.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure relate to providing a secure monitoring system that may be used to securely monitor the operation of secure applications in a computing environment. The secure monitoring system may detect unauthorized changes made to the secure applications, including runtime changes made to the applications or to monitoring data sent between the applications and the monitoring system. In general, secure applications may execute in a secure environment, such as a secure enclave, that uses cryptography-based techniques to protect the application, including its program code and data, from unauthorized access or changes. Monitoring systems may collect data about applications and their operation, such as whether particular applications are operational, the types of operations they are performing, the amount of resources they are utilizing, the servers on which they are executing, and so on. However, the data collected by existing monitoring systems can be falsified or otherwise changed impermissibly, e.g., by a compromised application. Existing monitoring systems do not ordinarily detect such unauthorized changes to monitoring data, particularly when the change occurs at runtime, e.g., while the application is executing. Encryption techniques such as encrypted communication channels (e.g., Transport Layer Security ("TLS") or the like) do not solve this problem, since unauthorized changes to applications at runtime can cause the application to provide incorrect data through the encrypted communication channels.

Unauthorized changes to application code or data at runtime may result in problems such as incorrect monitoring data being presented in system management user interfaces, or incorrect actions being taken by automated system management tools that rely on the monitoring data. Further, unauthorized changes to the application can alter the application identity, and the altered identity can be sent to other applications and monitoring services. If a compromised application provides incorrect monitoring data or an incorrect application identity, then visibility into the application's operation (such as its utilization of cluster resources) may be lost, resulting in an inability to properly manage the application and the resources it uses. As an example, an application may send heartbeat messages to monitoring systems to indicate the application's operational status. If a heartbeat message is sent by an application A, then a different application B should not be able to impersonate application A by sending a heartbeat message that contains application A's identity. However, if application B is compromised, it may be altered to send a heartbeat message falsely identifying itself as being sent from application A.

Aspects of the present disclosure address the above and other deficiencies by providing secure communication for sending monitoring data between an application and other applications or components, such as a monitoring system, at runtime. The monitoring data and the application's identity may be securely sent to a monitoring system, and unauthorized changes at runtime to application code or data, including the monitoring data, can be detected by the message recipient. The application may reside within a secure enclave that provides hardware-assisted protection against unauthorized access or modification of the application. The application code and data, including the association between the monitoring data and the application's identity, may be verified locally at the application's compute node using enclave-related operations, and verified remotely at the monitoring system that receives the monitoring data. The remote verification can detect unauthorized changes to the application's compute node that may not be detectable by the node itself. The local verification may involve generating a message authentication code (MAC) of the monitoring data and application's identity based on a secret key associated with the secure enclave of the application's compute node. The MAC may be verified by a node agent or other component that is located on the application's compute node and executing in a secure enclave.

In particular embodiments, the remote verification may include generating a digital signature, referred to herein as a remote attestation signature, based on the monitoring data and the application's identity using a node private key associated with the node agent. The monitoring data, application identity, and an application public key may be sent to the monitoring system in a monitoring message, and the monitoring system can verify the monitoring data and application identity using the remote attestation signature. The monitoring system may perform this verification using the remote attestation signature with a node public key that corresponds to the private key associated with the node agent. Further, the remote attestation signature itself and its association with the monitoring data and application identity may be verified by generating, at the application secure enclave, a monitoring message signature based on the remote attestation signature, the monitoring data, and application identity. The monitoring message signature may use an application private key for which the corresponding application public key may be sent to the monitoring system (e.g., in the monitoring data or other portion of the monitoring message). The monitoring system may use the application public key to verify the data that was signed with the monitoring message signature (e.g., the remote attestation signature, the monitoring data, and application identity).

If the local and remote verifications are successful, then the monitoring system may use the monitoring data received in the message to perform monitoring operations. For example, if the monitoring data includes heartbeat information, the monitoring system may update a status of the application to indicate that a heartbeat has been received from the application. If the verification is not successful, then an unauthorized change to the monitoring data or application identity may have occurred, and the monitoring system may take appropriate action, such as generating a warning, requesting that monitoring data be sent again, or stopping execution of or disabling the application identified by the application identity in the monitoring message, if appropriate (e.g., if the application identity is known to be correct).

Advantages of the present disclosure include, but are not limited to, detection of unauthorized changes to application monitoring data received by a monitoring system. Since the combination of the monitoring data and the application's identity is verified (using the remote attestation signature), the association between the monitoring data and the application's identity is verified, and unauthorized changes made at runtime to the application's identity, as well as to the monitoring data, can be detected.

Figure 1:
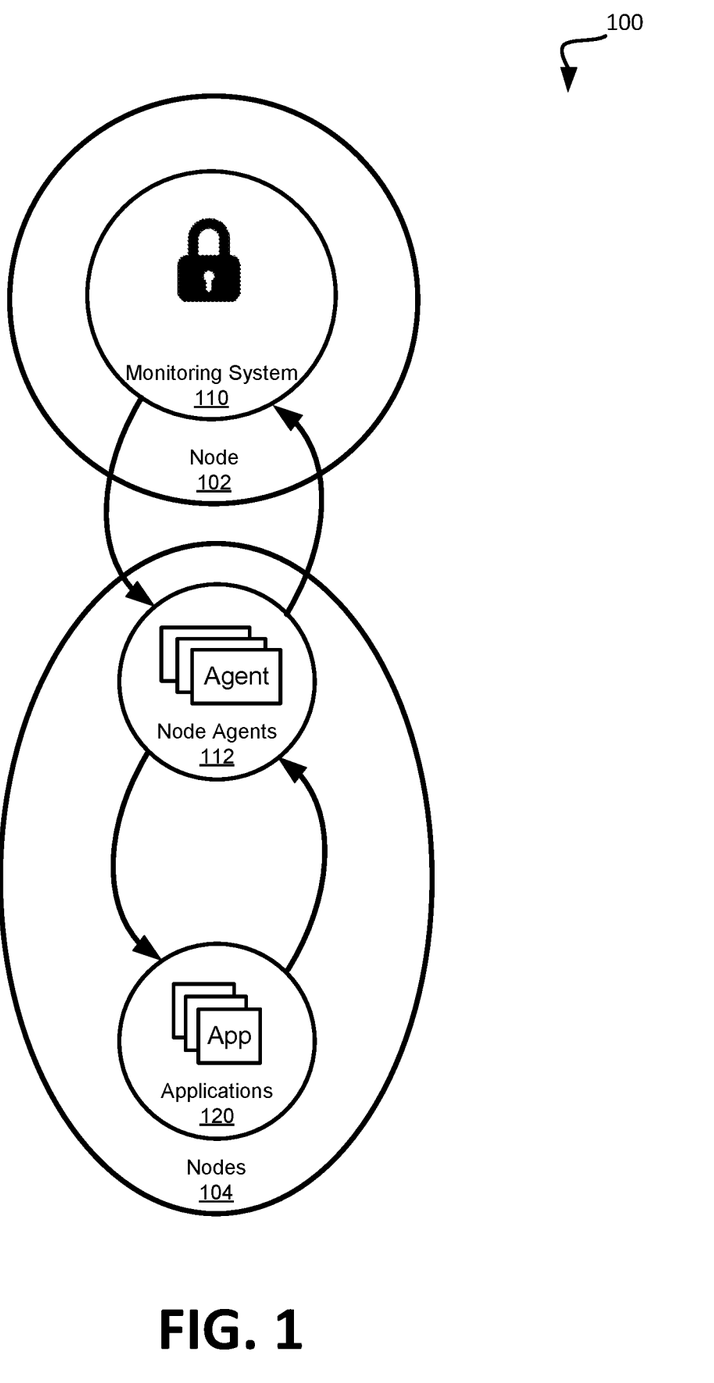
FIG. 1 illustrates an example environment to provide secure application monitoring in accordance with particular embodiments of the present disclosure.

FIG. 1 illustrates an example environment to provide secure application monitoring in accordance with particular embodiments of the present disclosure. The environment 100 may correspond to a network cluster that includes compute nodes that are part of the network cluster in which applications 120 executing on one or more nodes 104 are monitored via node agents 112 executing on the nodes 104 by a monitoring system 110 executing on one or more nodes 102.

As shown in FIG. 1, the environment 100 may correspond to a network cluster (i.e. a secure cluster) that includes nodes 102 and 104. Although two nodes are shown as being part of the network cluster, any number of nodes may be included in the network cluster. Each of the nodes 102 may correspond to a monitoring system. Each of the nodes 104 may correspond to a node agent 112 and one or more applications 120. The node agent may perform infrastructure-related operations such as managing and monitoring the applications 120. As described in more detail below with regards to FIG. 2, each application 120 and node agent 112 may be assigned or designated to a secure enclave by a processing device so that data of the applications and node agents may not be read from or written to except by the secure enclave. The nodes 102 and 104 may be compute nodes as described with regards to FIG. 2.

Figure 2:
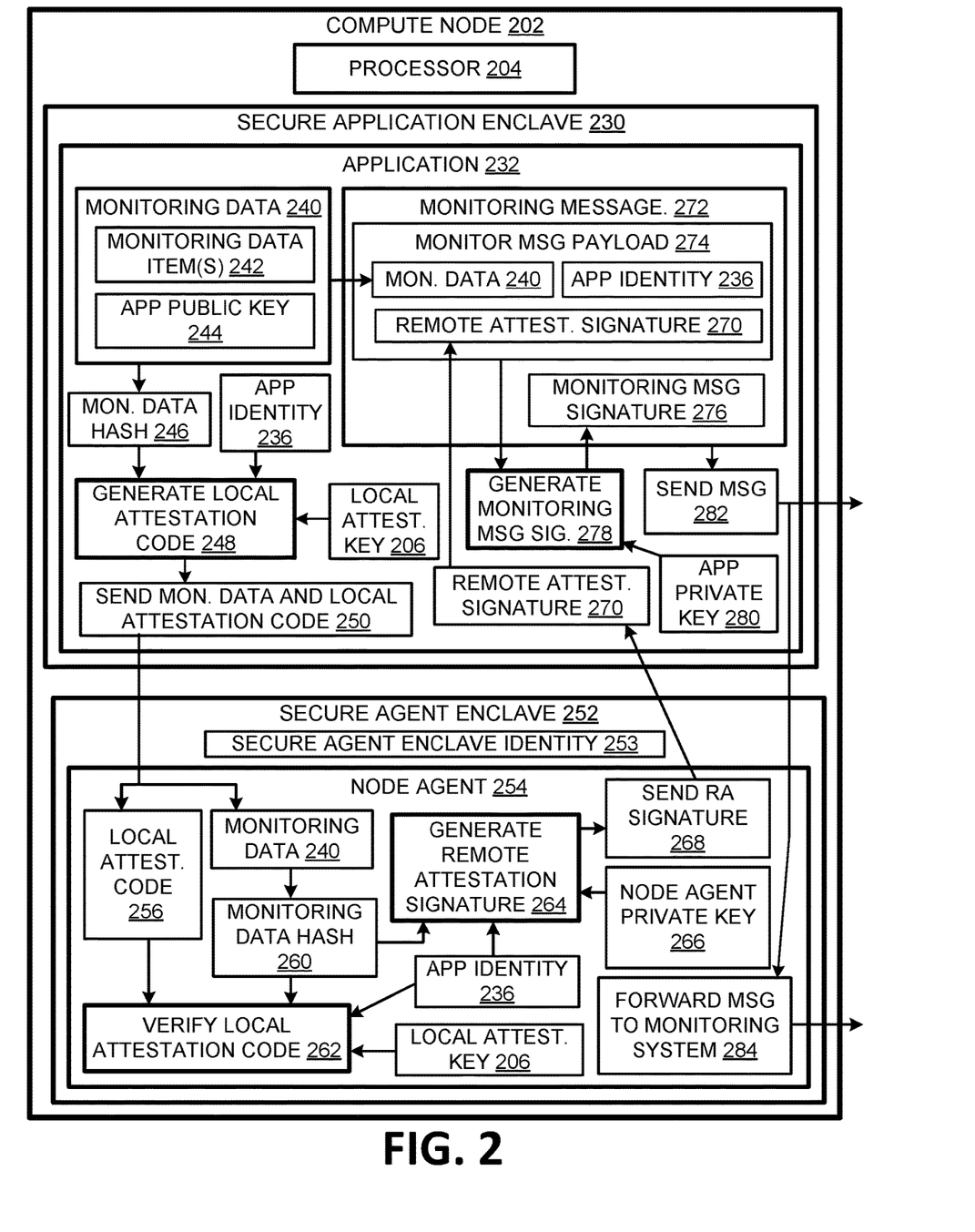
FIG. 2 illustrates an example compute node with a secure application enclave and secure node agent enclave to generate secure monitoring information in accordance with particular embodiments of the present disclosure.

FIG. 2 illustrates an example compute node with a secure application enclave and secure node agent enclave to generate secure monitoring information in accordance with particular embodiments of the present disclosure.

As shown in FIG. 2, an application 232 may be executed in a secure application enclave of a compute node 202 by a processor 204. The application 232 may include, for example, computer program code that provides user-specified functionality. A node agent 254, which may perform infrastructure-related operations such as managing and monitoring the application 232, may be executed in a secure agent enclave 252 by the processor 204. Monitoring data 240 may be generated by the application 232 or by a component associated with the application 232, such as an infrastructure component linked with or otherwise associated with the application. The application 232 may generate the monitoring data. For example, a monitoring system may send requests for monitoring data to the application 232, and the applications may respond with the requested monitoring data. As another example, the application 232 may determine when to send monitoring data, such as heartbeat messages, to the monitoring system, e.g., at periodic times or when the application 232 perform particular operations that are of interest to the monitoring system. Applications 232 running in the secure application enclave and node agent 254 running in the secure agent enclave 252 may use hardware-based cryptography provided by the compute node 202 to protect their code and data against unauthorized access or modification.

In particular embodiments, the monitoring data 240 may include monitoring data items 242, which may be generated based on operations performed by the application 232. The monitoring data items 242 may include information about the application's runtime behavior, and may be generated by the application 232 or by a monitoring component associated with the application 232. For example, a monitoring component included in the application 232, such as monitoring library linked to the application 232, may generate the monitoring data items 242 based on the application's runtime behavior. The monitoring data items 242 may include information about the application, such as heartbeat information, which may include a heartbeat sequence number, application request processing rates, application errors and error rates, application memory usage, application CPU usage, application uptime, application average response time, amount of time spent performing particular application operations, and similar information for server computer systems on which applications are running (e.g., server heartbeat information, server request processing rates, and so on). The monitoring data 240 may also include timestamp information associated with the monitoring data items 242.

The monitoring data 240 may also include an application public key 244 to be used for signing a monitoring message 272 in which the monitoring data 240 may be sent to a monitoring system. The application public key 244 may be generated by the application 232, e.g., when the application is initialized on the compute node 202, as part of a public/ private key pair in which the application public key 244 is the public key and an application private key 280 (described below) is the private key. The application key pair may be used for verifying the monitoring messages 272. If an application 232 is run on multiple nodes, the application 232 on each node may generate a different key pair. Similarly, if the application 232 is restarted on the same node 202, it may generate a different key pair. While the application 232 is running, the application 232 may use the same key pair (and may thus use the same application private key 280 to sign its monitoring messages). The application 232 may be associated with an application identity 236, e.g., a data value that is different for each different instance of the application 232. The application identity 236 may be calculated based on hash value of the code and data of the application 232, or a hash value of the contents of the secure application enclave 230, for example.

The application 232 may perform local attestation operations to generate information that can be used to verify the application identity 236 and the monitoring data items 242. The local attestation process may be assisted by hardware operations performed by the processor 204. The application may generate, by executing instructions in the application enclave 230, the monitoring data 240 (e.g., a data structure) that includes monitoring data items 242 and the application public key 244 from the application key pair. The application 232 may generate a "local attestation code" at block 248. The local attestation code may be generated and stored in the secure application enclave 230. The local attestation code may be a Message Authentication Code ("MAC") (e.g., AES CMAC) computed by the processor based on a combination of the application identity 236 and a monitoring data hash value 246 using a local attestation key 206 as the MAC key.

Figure 6:
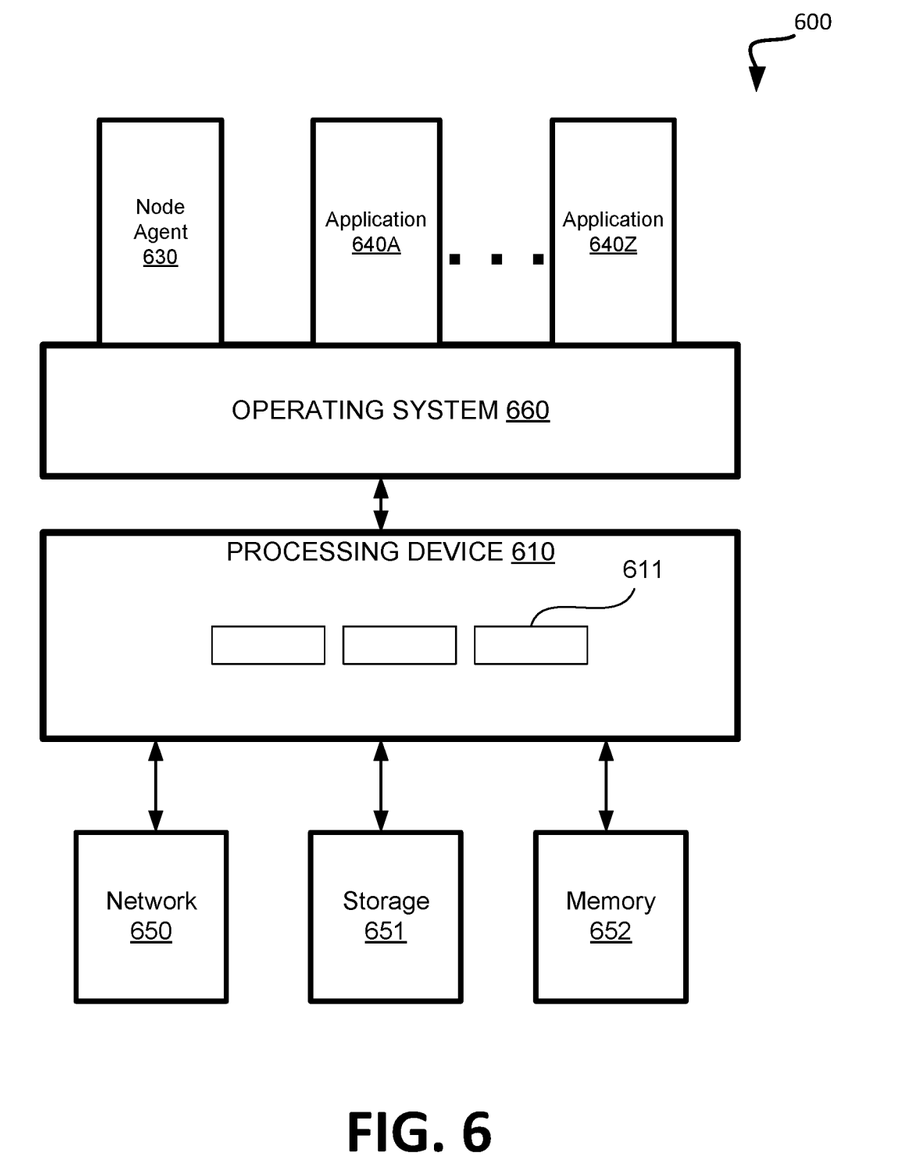
FIG. 6 illustrates an example network server with a secure application monitoring environment to execute an application in accordance with particular embodiments of the present disclosure.

The local attestation key 206 may be an internal cryptographic key 611 as shown in FIG. 6. The local attestation key 206 used by block 248 to generate the local attestation code 256 may be generated by local attestation operations performed by the processor, and the processor may generate the local attestation code 256 using the local attestation operations. The local attestation key 206, or, alternatively, a secret key from which the processor derives the local attestation key 206, may be maintained as a secret within the processor. In some embodiments, the derivation of the local attestation key 206 from a secret within the processor may incorporate a secure agent enclave identity 253 of the secure agent enclave 252 that will receive and verify the attestation, resulting in a value for the local attestation key 206 that is associated with the particular secure agent enclave identity 253. The local attestation key 206 may be securely communicated between the secure agent enclave 252 and the application enclave 230 by, for example, inter-enclave communication.

The application identity 236 may be an application enclave identity that identifies the application secure enclave, e.g., a cryptographic hash of the code and data in the secure enclave generated by the processor. The monitoring data hash 246 may be determined using a cryptographic hash function (e.g., SHA-256 or the like). The local attestation code 256 may be understood as locally-verifiable cryptographic evidence associating the statement with the application identity 236. The local attestation code 256 may be locally-verifiable by the local compute node 202 (e.g., by the processor 204). Block 250 may send the monitoring data 240 and local attestation code to the node agent 254 running in the secure agent enclave 252, e.g., via inter-enclave communication. The application identity 236 may also be sent to the node agent 254 if it is not otherwise accessible to the node agent 254 in the agent enclave 252. For example, the application identity 236 may be sent to the agent enclave via s secure inter-enclave communication channel established as part of a local attestation process.

The node agent 254 may receive the monitoring data 240 and local attestation code 256, and verify the local attestation code 256. The node agent 254 may verify that the received local attestation code 256 is an encoding (e.g., a MAC encoding) of the application identity 236 and monitoring data hash 246 in accordance with the local attestation key 206. In some embodiments, the node agent 254 may verify the local attestation code at block 262 by requesting the processor 204 to determine and provide the local attestation key 206 (which may be accessible only by the processor 204), computing a monitoring data hash 260 of the received monitoring data 240, computing an encoding (e.g., a MAC encoding) of the application identity 236 and monitoring data hash 260 in accordance with the local attestation key 206, and verifying that the computed encoding is the same as the local attestation code 256 received from the application. In other embodiments, the node agent 254 may request the processor 204 to determine the validity of the local attestation code 256. The local attestation key 206 may be determined (e.g., derived) at the secure agent enclave 252 by the processor based on the secure agent enclave identity 253 (or based on a value associated with the secure agent enclave identity 253). The node agent 254 may ask the processor 204 to verify that the received application identity 236 is valid according to the processor 204's local attestation rules for secure enclaves.

As an example, at block 262, the node agent 254 may invoke a local attestation operation of the processor 204 to cause the processor to determine an internal key that corresponds to the local attestation key 206 used by the secure application enclave 230 to generate the local attestation code 256. The node agent 254 may use the cryptographic hash function described above to compute an expected value of the monitoring data hash 246 based on the monitoring data 240 received from the application enclave 230, then compute a MAC based on combination of the application identity 236 and expected value of the monitoring data hash 246, using the local attestation key 206 as the MAC key. The computed MAC may be compared to the received local attestation code 256. If the computed MAC is equal to the received local attestation code 256, then the local attestation code 256 has been successfully verified, e.g., the received monitoring data 240 and application identity 236 are valid according to the local attestation code 256. Although particular encryption techniques for verifying the local attestation code 256 are described in the examples above, other suitable cryptographic techniques may be used in other examples. For example, although a MAC is described, other cryptographic authentication techniques may be used.

In particular embodiments, if the verification of the local attestation code 256 at block 262 is successful, the node agent 254 may compute a remote attestation signature at block 264 so that a remote node, such as a node of the monitoring system, may verify the monitoring data 240 and application identity 236, which the monitoring system may receive in a monitoring message 272. Remote attestation may be useful, for example, in case the processor 204 or other component of the compute node 202 has been compromised. Note that the remote attestation signature may be computed and stored in memory of the agent enclave 252, although it is not shown as being in the agent enclave 252 in FIG. 2. The remote attestation signature computed in the node agent enclave 252 may be sent to the application enclave 232 (where it is shown at remote attestation signature 270 in FIG. 2). The remote attestation signature may be, e.g., an RSA digital signature, and may be understood as remotely-verifiable cryptographic evidence securely associating the monitoring data 240 with the application identity 236. The remote attestation signature 270 may be remotely-verifiable by nodes other than the local compute node 220. The remote attestation signature 270 may be generated (at block 264) by computing a cryptographic hash value based on the monitoring data hash 260 (or, alternatively, on the monitoring data 240 itself) and the application identity 236, and encrypting the cryptographic hash value with a private key, such as a node agent private key 266. The node agent private key 266 may be, e.g., a private key associated with the compute node 202 on which the node agent 254 is located and for which the corresponding node public key is known to the monitoring system. The node agent private key 266 may be available to the node agent 254 after having been determined or generated by the node agent 254 at node-enrollment time (e.g., when the compute node 202 is added to the monitoring system) by an authentication protocol.

In particular embodiments, the node agent 254 may send the remote attestation signature to the application 232 or to an application-associated component (e.g., an infrastructure-related component associated with the application) located in the application enclave 230, e.g., via inter-enclave communication (at block 268). Further, the node agent 254 may locally attest (e.g., verify using a local attestation key) the remote attestation signature 270 and any other related information the node agent 254 sends to the application enclave 230.

The application 232 may receive the remote attestation signature 270 at the application enclave 230, and construct a monitor message 272 to be sent to the monitoring system. The monitor message 272 may include a monitor message payload 274, which may include the statement 240, the application identity 236, and the remote attestation signature 270. The application 232 may sign the payload 274, using an application private key 280 as the signing key, by generating a monitor message signature 276 based on the payload 274 and the application private key 280 (at block 278). For example, the application 232 may compute a hash value based on the payload 274 and encrypt the hash value using the application private key 280. The encrypted hash value may be stored in the monitoring message 272 (or otherwise associated with the monitoring message 272) as the monitoring message signature 276. The application private key 280 may be generated by the application 232, e.g., when the application is initialized on the compute node 202, as part of a public/private key pair in which the application public key 244 is the counterpart public key.

In particular embodiments, the application may send the monitoring message 272 to a monitoring system (block 282). Alternatively or additionally, the application 232 may send one or more monitor messages 272 to the node agent 254, which may forward the monitor messages 272 to the monitoring system (block 284). The application 232 may send the monitoring message 272 to the node agent 254 for forwarding, if, for example, the node agent 254 has a network connection to the monitoring system but the application 232 does not. The monitoring message 272 sent to the monitoring system may contain the payload 274 and the monitoring message signature 276. The payload 274 may contain the monitoring data 240 (which may in turn contain the monitoring data items 242 and the application public key 244), the application identity 236, and the remote attestation signature 270. Messages such as the monitoring message 272 may be sent between nodes via a suitable communication network. The application identity 236, or a value derived from or corresponding to the application identity 236, may be, but need not be, provided to the monitoring system. For example, the monitoring system may receive a heartbeat with an application identity 236 that it has not previously seen, and create a record containing the previously-unseen application identity 236, which the monitoring system may associate with an application. Subsequent monitoring messages 272 containing the same application identity may be associated with that record and application.

Note that although operations are described herein as being performed by the application 232, they may alternatively or additionally be performed, at least in part, by other components associated with the application, e.g., infrastructure-related components linked with the application 232. The other components may be invoked by the application 232 or in response to particular operations performed by the application 232, such as sending a message. The other components may be stored in and execute in the application enclave 230 with the application 232.

Figure 3:
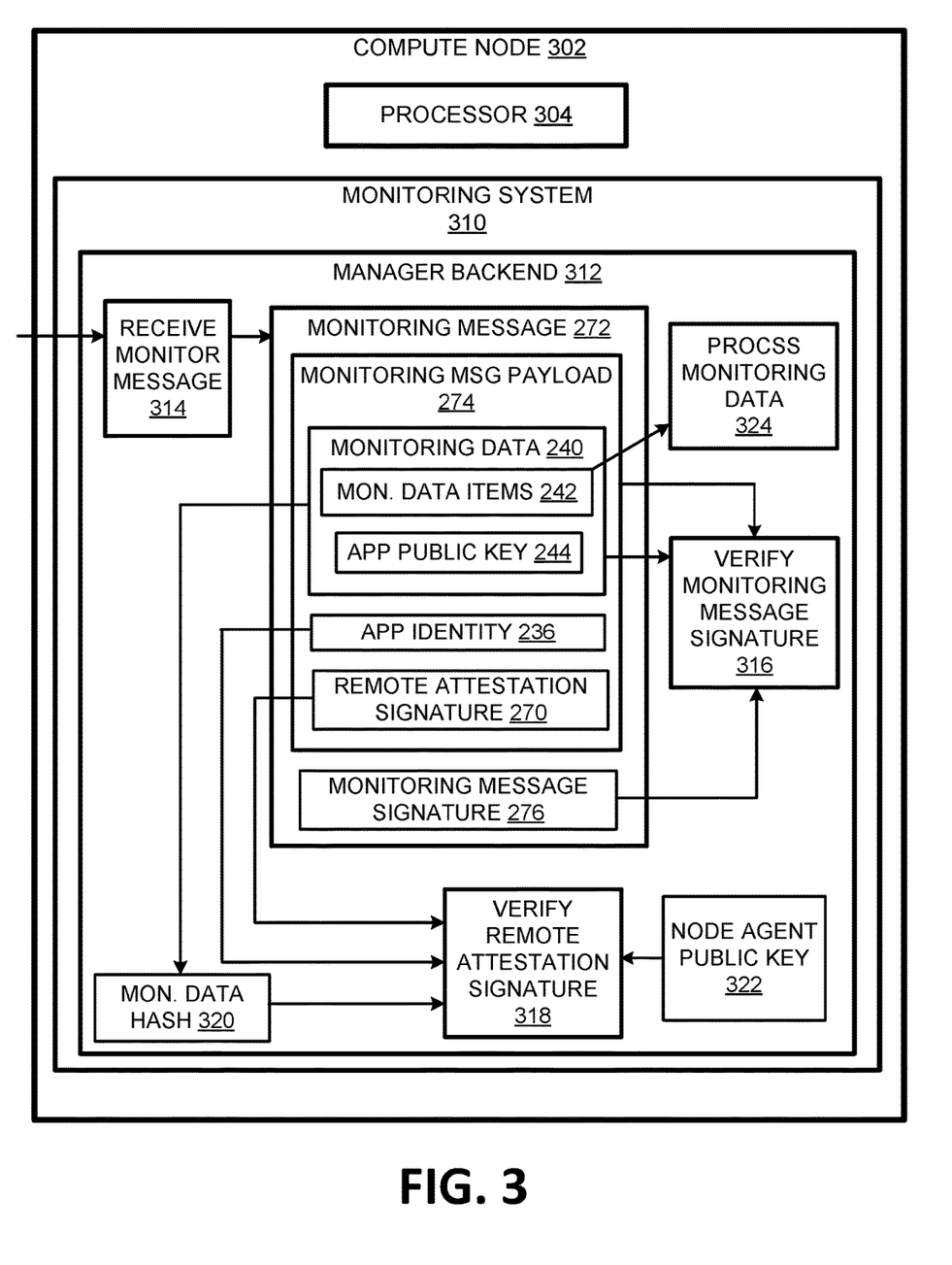
FIG. 3 illustrates an example compute node with a secure application monitoring system to receive, verify, and process secure monitoring information in accordance with particular embodiments of the present disclosure.

FIG. 3 illustrates an example compute node with a secure application monitoring system to receive, verify, and process secure monitoring information in accordance with particular embodiments of the present disclosure.

As shown in FIG. 3, the monitoring system 310 may receive a monitoring message 314 (block 314). The received monitoring message 314 may include the same information as the monitoring message 272 generated by the application 232. The monitoring system 310 may perform verification operations to detect whether there are any differences between the received monitoring message 314 and the monitoring message 272 generated by the application. The monitoring system 310 may verify the message payload 274 signed by the monitoring message signature 276 (block 316) and the message contents signed by the remote attestation signature 270 (block 318). To verify the message payload 274 (block 316), the monitoring system 310 may extract the application public key 244 from the statement 240 and use the application public key 244 to decrypt the monitor message signature 276, thereby producing an expected payload hash value. The monitoring system 310 may compute an actual hash value based on the payload 274 (e.g., using the same technique the application 232 used when generating the monitoring message signature). The monitoring system 310 may compare the actual hash value to the expected hash value. If the expected hash value matches the actual hash value, then the verification of the payload is successful, and a verification of the data signed by the remote attestation signature 270 may be performed (at block 318, as described below).

Although particular encryption techniques for verifying the monitor message signature 276 are described in the examples above, other suitable encryption techniques may be used in other examples. For example, although asymmetric encryption is described, symmetric encryption may be used in other examples. Further, although the application 232 sends monitoring messages 272 to the monitoring system 310 in the examples described above, the monitoring system 310 may also send messages to the application 232, e.g., requests for the application 232 to send the monitoring messages 272. The monitoring system 310 may send messages to the application 232 that are encrypted with the node agent public key 322 (or other encryption key), and the application 232 may decrypt the messages using the node agent private key 266, for example. Still further, although the application public key 244 is sent to the monitoring system 310 in the examples described above, the application public key 244 may alternatively be communicated to the monitoring system 310 by another mechanism, such as a key distribution system.

The monitoring system 310 may verify the message contents signed by the remote attestation signature 270 (block 318). To perform this verification, the monitoring system 310 may decrypt the remote attestation signature 270 of the received message 272 using a node agent public key 322. The node agent public key 322 may be available to the monitoring system 310 after having been determined, for example at node-enrollment time by an authentication protocol that involves the node agent 254 and the monitoring system 310. The node agent public key 322 may be received from the node agent 254 or from another source, such as a key distribution mechanism using a key exchange or key agreement protocol. Decrypting the remote attestation signature 270 may produce an expected hash for the message data 240. An actual monitor data hash 320 may be computed based on the monitoring data 240 and application identity 236 in the received monitoring message 272. The actual monitor data hash 320 may be calculated based on the received monitor message 272 using the same technique that was used to compute a hash when generating the remote attestation signature at block 264. If the actual monitor data hash 320 matches (e.g., is equal to) the expected hash value, then the verification of the monitoring data 240 and application identity 236 using the remote attestation signature 270 is successful.

If the verification of the message payload 274 signed by the monitoring message signature 276 (at block 316) and the verification of the message contents signed by the remote attestation signature 270 (at block 318) are both successful, then the monitoring message 272 has been successfully verified, and the monitoring data 240 and the application identity 236 may be considered valid. Alternatively, the monitoring message 272 may be considered successfully verified when at least one of the monitoring message signature verification (block 316) or remote attestation signature verification (block 318) is successful. When the monitoring message 272 has been successfully verified, the monitoring system may retrieve the monitoring data items 242 from the monitoring message 272 and process the monitoring data items 242. For example, if the monitoring data items 242 include heartbeat information, such as a heartbeat sequence number, then the monitoring system 310 may update its records with an indication that a heartbeat with the specified sequence number was received from the application identified by the application identity 236 at the time the monitoring message 272 was received.

The monitoring system 310 may determine a particular action to take when an invalid monitoring message 272 is detected, or when the no monitoring messages 272 are received within a threshold amount of time from an application 232. In such situations the application may have stopped running, or the network connection to the application have been broken or interrupted. When the monitoring system receives a cryptographically invalid monitoring message, it may stop or otherwise terminate the application that sent the message, but doing so may enable an attack in which an invalid heartbeat message may be sent to stop the application. Instead, when an invalid monitoring message is received, the monitoring system may generate a warning and record how many invalid monitoring messages have been received from each application.

Aggregated information about invalid monitoring messages, e.g., over a period of time or for multiple applications, may be useful for identifying problems with applications. The number of different applications from which invalid monitoring messages have been received may also be used to determine a particular action to take. If multiple applications, e.g., more than three, have sent invalid monitoring messages, then there is likely a problem with the applications themselves or the infrastructure itself, rather than an invalid message attack meant to stop the applications. For example, if more than a threshold number of invalid monitoring messages have been received for a particular identified application within a threshold period of time, and/or invalid monitoring messages have been received from more than a threshold number of difference applications within a threshold period of time, the monitoring system may stop or otherwise terminate the identified application, or revoke the hardware trust status of the node on which the application is believed to be running. A node enrollment process may then be performed to re-enroll the node in a cluster. In other examples, the monitoring system may send a request for monitoring data to an application after a threshold duration of time or at periodic intervals after an invalid monitoring message has been received from the application.

In particular embodiments, the monitoring system may use the monitoring data to generate or update a user interface view that shows running applications. For each running application, the user interface may indicate which node is executing the application, and display a status indicator, which may be green to indicate that the application is operating normally, yellow to indicate a potential problem (e.g., at least one but not more than a threshold number of invalid monitoring data messages have been received from the application within a threshold period of time, or the application is processing data at a slow rate, or red (e.g., more than the threshold number of invalid monitoring data messages have been received from the application within the threshold period of time).

Heartbeat information may be useful for determining if an application has failed. Monitoring messages 272 generated for an application are securely associated with the application and cannot be generated by other applications, so heartbeat information in the monitoring messages 272 may be used to reliably identify applications that have failed or are otherwise not responsive. An application that is not running in a secure enclave or is running in a forged enclave does not have access to the data needed to generate the signatures needed for a valid communication with the monitoring system 310.

Figure 4A:
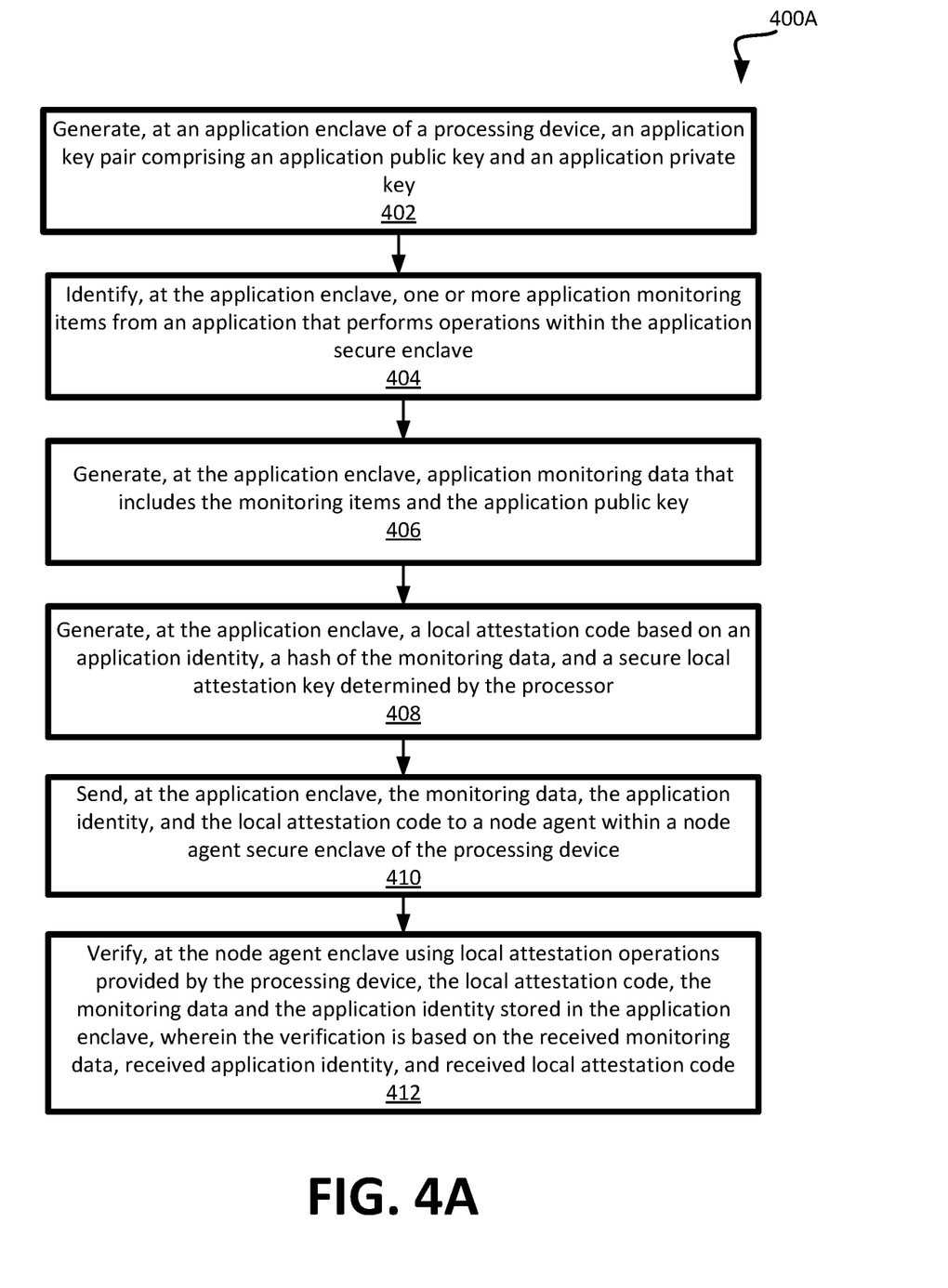
FIGS. 4A and 4B are flow diagrams of example methods to generate secure monitoring information in accordance with particular embodiments of the present disclosure.
Figure 4B:
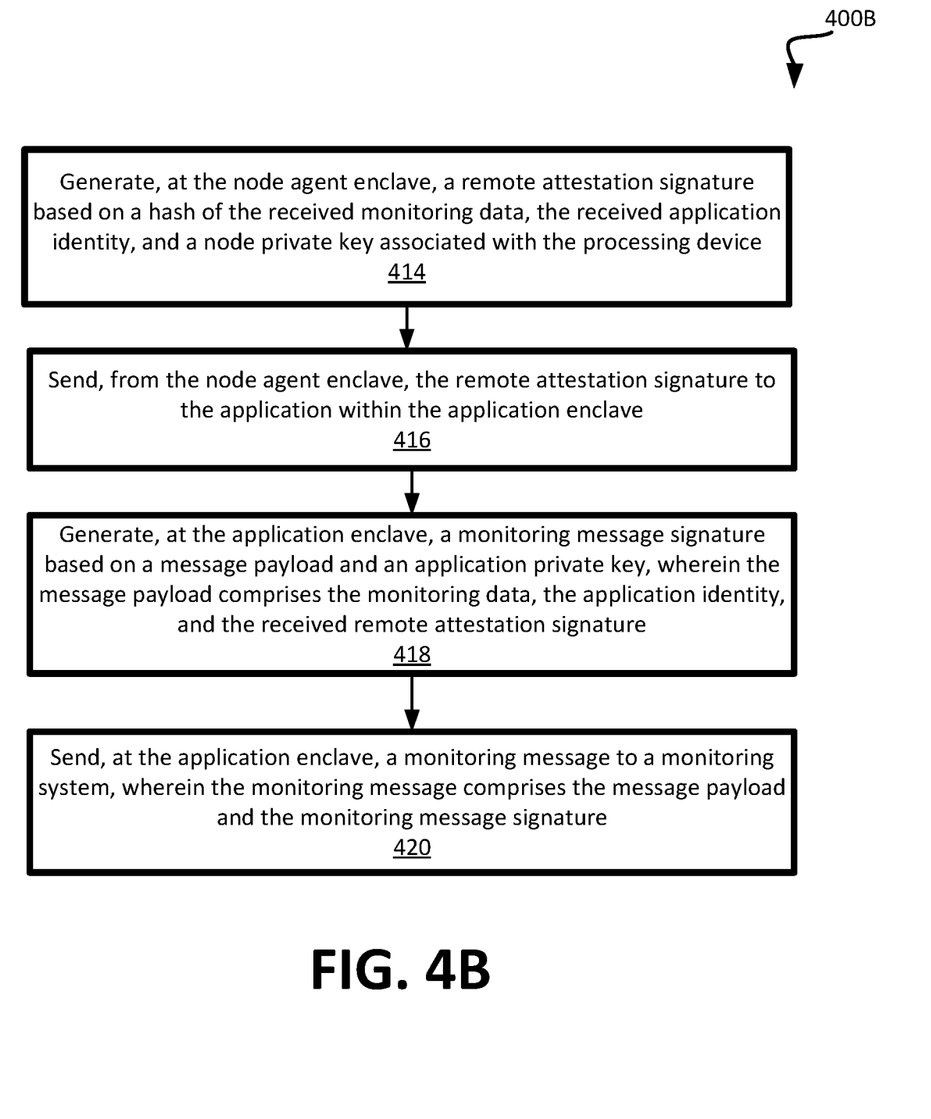

FIGS. 4A and 4B are flow diagrams of an example method 400 to generate secure monitoring information in accordance with particular embodiments of the present disclosure. The method 400 is shown and described as two methods 400A and 400B for illustrative purposes. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by application 232 at an application enclave 230 and a node agent 254 at an agent enclave 252 of FIG. 2.

As shown in FIG. 4A, the method 400A may begin with processing logic of an application at an application enclave generating an application key pair comprising an application public key and an application private key (block 402). The processing logic may subsequently identify, at the application enclave, one or more application monitoring items from the application that performs operations within the application secure enclave (block 404). The processing logic may further generate, at the application enclave, application monitoring data that includes the monitoring items and the application public key (block 406). The processing logic may further generate, at the application enclave, a local attestation code based on an application identity, a hash of the monitoring data, and a secure local attestation key determined by the processor (block 408).

The processing logic may further send, at the application enclave, the monitoring data, the application identity, and the local attestation code to a node agent within a node agent secure enclave (block 410). The node agent at the node agent enclave may further verify, using local attestation operations, the local attestation code, the monitoring data and the application identity, wherein the verification is based on the received monitoring data, received application identity, and received local attestation code (block 412). The method 400 to generate secure monitoring information may continue at block 414 as shown in FIG. 4B.

As shown in FIG. 4B, the method 400B may begin with processing logic of a node agent at an agent enclave generating a remote attestation signature based on a hash of the received monitoring data, the received application identity, and a node private key (block 414). The processing logic may subsequently send, from the node agent enclave, the remote attestation signature to the application within the application enclave (block 416). The processing logic of the application at the application enclave may further generate a monitoring message signature based on a message payload and an application private key, wherein the message payload comprises the monitoring data, the application identity, and the received remote attestation signature (block 418). The processing logic may further send, at the application enclave, a monitoring message to a monitoring system, wherein the monitoring message comprises the message payload and the monitoring message signature (block 420).

Figure 5:
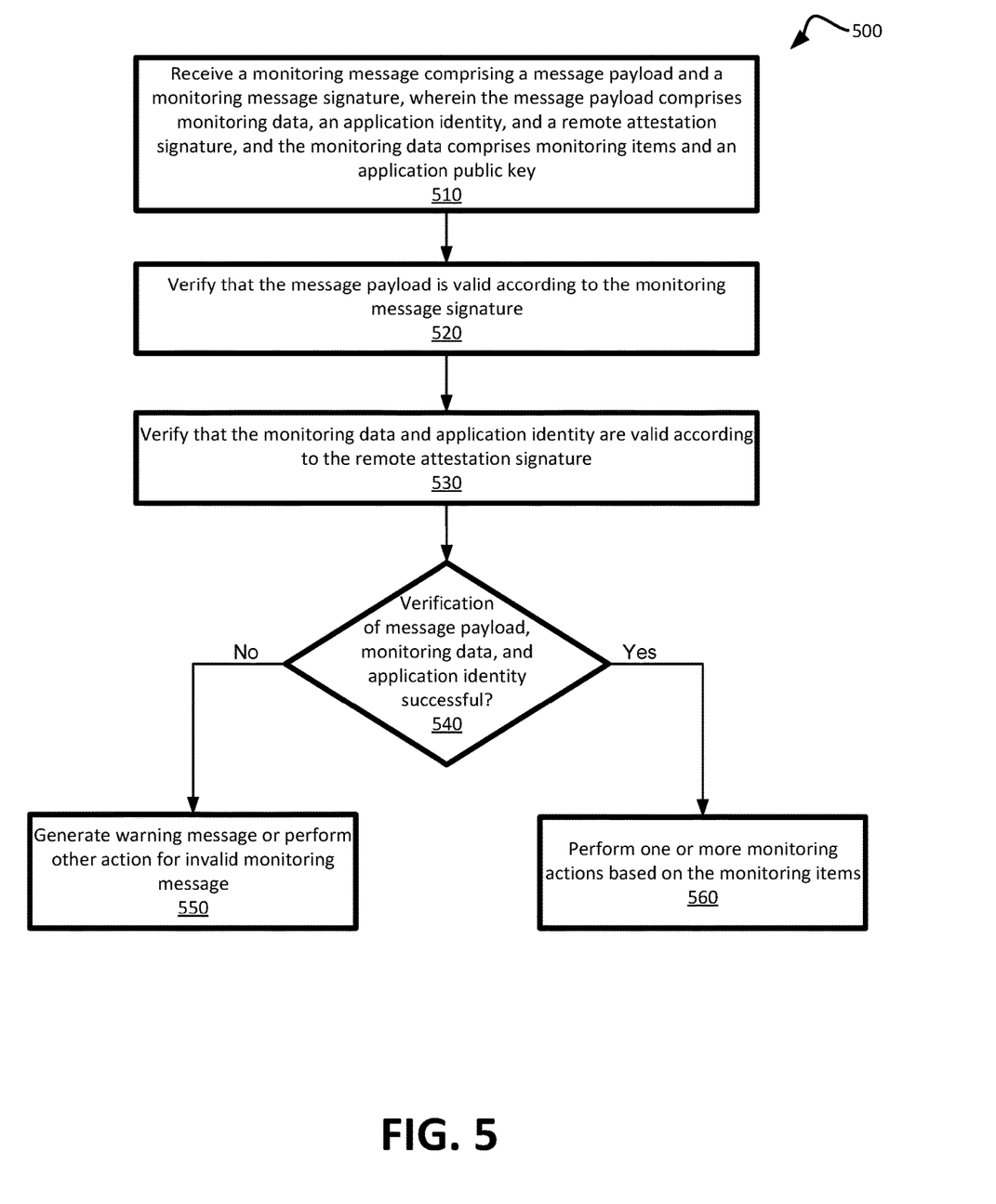
FIG. 5 is a flow diagram of an example method to receive and process secure monitoring information in accordance with particular embodiments of the present disclosure.

FIG. 5 is a flow diagrams of an example method 500 to receive, verify, and process secure monitoring information secure monitoring information in accordance with particular embodiments of the present disclosure. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the monitoring system 110 of FIG. 1.

As shown in FIG. 5, the method 500 may begin with receiving a monitoring message comprising a message payload and a monitoring message signature (block 510). The message payload may include monitoring data, an application identity, and a remote attestation signature, and the monitoring data may include monitoring items and an application public key. The processing logic may subsequently verify that the message payload is valid according to the monitoring message signature (block 520). The processing logic may further verify that the monitoring data and application identity are valid according to the remote attestation signature (block 530). The processing logic may further determine whether the verification of message payload, monitoring data, and application identity performed at blocks 520 and 530 was successful (block 540). If the verification was successful (e.g., the monitoring message signature and remote attestation signature were successfully verified), the processing logic may perform one or more monitoring actions based on the monitoring items. If the verification was not successful (e.g., the monitoring message signature, the remote attestation signature, or both were not successfully verified), then the processing logic may generate a warning message or perform another action addressing an unsuccessful verification.

FIG. 6 illustrates an example network server 600 with a secure application monitoring environment in accordance with particular embodiments of the present disclosure. In general, a node agent 630 may be hosted by a network server to provide secure application monitoring for one or more other applications 640A to 640Z that are also hosted by the network server or another network server. The node agent 630 and applications 640A to 640Z may correspond to a node 104 of FIG. 1.

As shown in FIG. 6, the network server 600 may include a processing device 610 that may execute an operating system 620. Furthermore, the processing device 610 may include one or more internal cryptographic keys 611 that may be used to encrypt and decrypt data stored in a portion of a memory that is assigned to a secure enclave of each of the applications 640A to 640Z. The access to the data of each node agent 112 in a node agent secure enclave and each application 640A to 640Z in a corresponding application secure enclave (e.g., data stored at a storage resource) may be protected from other ones of the node agents 112 and applications 640A to 640Z and the operating system 620. For example, the access to the data of the secure enclave corresponding to the secure service 630 may be protected by the use of one of the internal cryptographic keys 611 that are internal to the processing device 610 so that the access to the data is based on a hardware access as opposed to a software access. The operating system 620 may be associated with a first privilege level and the secure service 630 and the applications 640A to 640Z may be associated with a second privilege level where the first privilege level of the operating system is more privileged than the second privilege level of the various applications that are run on the operating system 620 (e.g., the more privileged level allows access to more resources of the network server than the less privileged level). Thus, the operating system 620 may be allowed access to resources of the node agents 630 and the applications 640A to 640Z. However, since the node agents 630 and applications 640A to 640Z are assigned to a secure enclaves where access to the data of the secure enclaves is based on the use of an internal cryptographic key 611 of the processing device 611, the operating system 620 may not be able to access the data of the node agent 630 and applications 640A to 640Z despite having a more privileged level of access than the secure service 630. The master key that is used to decrypt data at the storage resource may be an internal cryptographic key 611.

Figure 7:
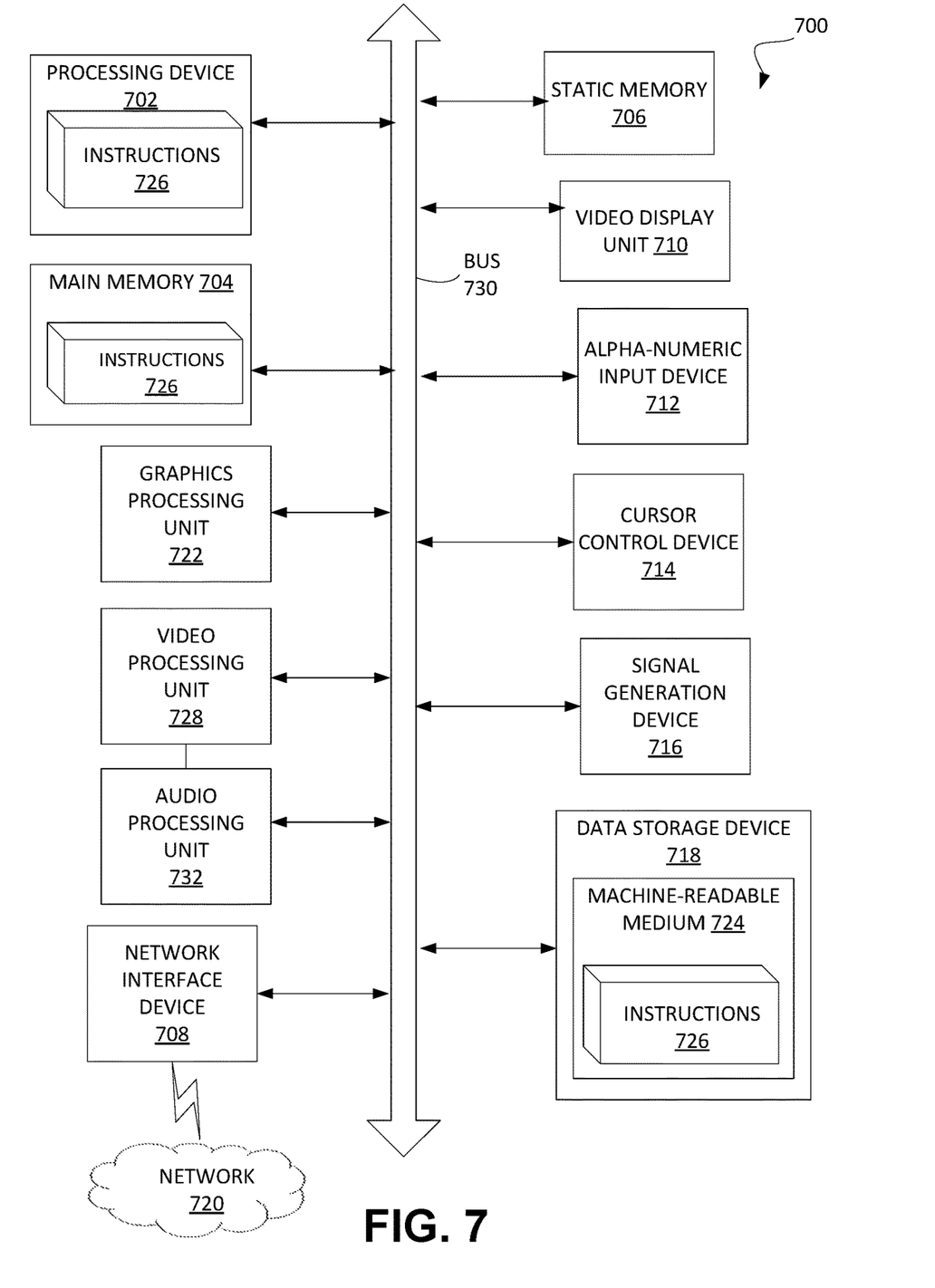
FIG. 7 illustrates an example computer system in which embodiments of the present disclosure operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality as described herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic processing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
identifying, at a first secure enclave of a processing device, application monitoring data from an application that performs operations within the first secure enclave;
generating, at the first secure enclave, using local attestation operations, a first message authentication code based on a combination of the monitoring data, an application identity associated with the application, and a secure local attestation key;
sending, at the first secure enclave, the first message authentication code, the monitoring data, and the application identity to a second secure enclave;
receiving, from the second secure enclave, a remote attestation signature that is based at least on the monitoring data and the application identity;
generating, at the first secure enclave, a monitoring message signature based on a message payload and an application private key, wherein the message payload comprises the monitoring data, the application identity, and the remote attestation signature; and
sending, from the first secure enclave, a monitoring message to a monitoring system, wherein the monitoring message comprises the message payload and the monitoring message signature.

2. The method of claim 1, wherein the generating, at the first secure enclave, the monitoring message signature comprises:
computing a hash value based on the message payload; and
encrypting the hash value using the application private key as an encryption key to form the monitoring message signature.

3. The method of claim 1, wherein the secure local attestation key is generated by the local attestation operations and is inaccessible to the application.

4. The method of claim 1, wherein the monitoring data comprises heartbeat data, and the heartbeat data comprises a heartbeat sequence number.

5. The method of claim 1, wherein the sending, from the first secure enclave, the monitoring message to the monitoring system comprises sending the monitoring message to a node agent within the second secure enclave, wherein the node agent is configured to communicate with the monitoring system, and the node agent sends the monitoring message to the monitoring system.

6. A method comprising:
receiving, by a computing device, a monitoring message from an application that performs operations within a first secure enclave, the monitoring message comprising a message payload and a monitoring message signature,
wherein the message payload comprises monitoring data of the application, an application identity of the application, and a remote attestation signature that was provided by a node agent that operates within a second secure enclave, wherein the monitoring data includes an application public key generated by the application, and wherein the monitoring message signature is based on the message payload and an application private key generated by the application;
determining, by the computing device, whether the monitoring message is valid according to the monitoring message signature and the application public key included in the monitoring data; and
in response to determining that the monitoring message is valid, performing, by the computing device, one or more actions based on the monitoring data.

7. The method of claim 6, further comprising:
in response to determining that the monitoring message is invalid, generating, by the computing device, a warning message indicating that an invalid monitoring message has been received.

8. The method of claim 6, wherein the determining, by the computing device, whether the monitoring message is valid comprises:
computing a first hash value based on the message payload;
decrypting the monitoring message signature using the application public key to form a second hash value, wherein the application public key corresponds to the application private key; and
comparing the first hash value to the second hash value, wherein the monitoring message is valid if the first hash value matches the second hash value.

9. The method of claim 6, wherein determining, by the computing device, whether the monitoring message is valid comprises decrypting the monitoring message signature using the application public key to form a second hash value; and
comparing the second hash value to a first hash value that is based on the message payload.

10. The method of claim 6, wherein the determining, by the computing device, whether the monitoring message is valid comprises:
computing a first hash value based on the monitoring data and the application identity;
decrypting the remote attestation signature using a node public key associated with the computing device to form a second hash value, wherein the node public key corresponds to a node private key associated with the node agent; and
comparing the first hash value to the second hash value, wherein the monitoring message is valid according to the remote attestation signature if the first hash value matches the second hash value.

11. A system comprising:
a memory; and
a processing device, operatively coupled with the memory, to:
identify, at a first secure enclave, application monitoring data from an application that performs operations within the first secure enclave;
generate, at the first secure enclave, using local attestation operations, a first message authentication code based on a combination of the monitoring data, an application identity associated with the application, and a secure local attestation key;
send, at the first secure enclave, the first message authentication code, the monitoring data, and the application identity to a second secure enclave;
receive, from the second secure enclave, a remote attestation signature that is based at least on the monitoring data and the application identity;
generate, at the first secure enclave, a monitoring message signature based on a message payload and an application private key, wherein the message payload comprises the monitoring data, the application identity, and the remote attestation signature; and send, from the first secure enclave, a monitoring message to a monitoring system, wherein the monitoring message comprises the message payload and the monitoring message signature.

12. The system of claim 11, wherein to generate, at the first secure enclave, the monitoring message signature, the processing device is further to:

compute a hash value based on the message payload; and encrypt the hash value using the application private key as an encryption key to form the monitoring message signature.

13. The system of claim 11, wherein the secure local attestation key is inaccessible to the application.

14. The system of claim 11, wherein the monitoring data comprises heartbeat data, and the heartbeat data comprises a heartbeat sequence number.

15. The system of claim 11, wherein to send, from the first secure enclave, the monitoring message to the monitoring system, the processing device is further to:

send the monitoring message to a node agent within the second secure enclave, wherein the node agent is configured to communicate with the monitoring system, and the node agent sends the monitoring message to the monitoring system.

16. A non-transitory machine-readable storage medium storing instructions that cause a processing device to perform operations comprising:

identifying, at a first secure enclave of a processing device, application monitoring data from an application that performs operations within the first secure enclave;

generating, at the first secure enclave, using local attestation operations, a first message authentication code based on a combination of the monitoring data, an application identity associated with the application, and a secure local attestation key;

sending, at the first secure enclave, the first message authentication code, the monitoring data, and the application identity to a second secure enclave;

receiving, from the second secure enclave, a remote attestation signature that is based at least on the monitoring data and the application identity;

generating, at the first secure enclave, a monitoring message signature based on a message payload and an application private key, wherein the message payload comprises the monitoring data, the application identity, and the remote attestation signature; and sending, from the first secure enclave, a monitoring message to a monitoring system, wherein the monitoring message comprises the message payload and the monitoring message signature.

17. The non-transitory machine-readable storage medium of claim 16, wherein the generating, at the first secure enclave, the monitoring message signature comprises:

computing a hash value based on the message payload; and encrypting the hash value using the application private key as an encryption key to form the monitoring message signature.

18. The non-transitory machine-readable storage medium of claim 16, wherein the secure local attestation key is generated by the local attestation operations and is inaccessible to the application.

19. The non-transitory machine-readable storage medium of claim 16, wherein the monitoring data comprises heartbeat data, and the heartbeat data comprises a heartbeat sequence number.

20. The non-transitory machine-readable storage medium of claim 16, wherein the sending, from the first secure enclave, the monitoring message to the monitoring system comprises sending the monitoring message to a node agent within the second secure enclave, wherein the node agent is configured to communicate with the monitoring system, and the node agent sends the monitoring message to the monitoring system.

* * * * *